United States Patent
Halm et al.

(10) Patent No.: US 10,625,385 B2
(45) Date of Patent: Apr. 21, 2020

(54) SPINDLE UNIT FOR TURNING AND MILLING MACHINES

(71) Applicant: Gildemeister Drehmaschinen GmbH, Bielefeld (DE)

(72) Inventors: Christian Halm, Bielefeld (DE); Robert Laxy, Paderborn (DE)

(73) Assignee: Gildemeister Drehmaschinen GmbH, Bielefeld (DE)

( * ) Notice: Subject to any disclaimer, the term of this patent is extended or adjusted under 35 U.S.C. 154(b) by 498 days.

(21) Appl. No.: 14/560,743

(22) Filed: Dec. 4, 2014

(65) Prior Publication Data

US 2015/0151395 A1 Jun. 4, 2015

(30) Foreign Application Priority Data

Dec. 4, 2013 (EP) ..................................... 13195734

(51) Int. Cl.
*B23Q 5/10* (2006.01)
*B23Q 11/10* (2006.01)
(Continued)

(52) U.S. Cl.
CPC ............ *B23Q 5/10* (2013.01); *B23B 31/1261* (2013.01); *B23B 31/265* (2013.01);
(Continued)

(58) Field of Classification Search
CPC .... B23Q 5/10; B23Q 17/003; B23Q 11/1015; B23B 31/261
(Continued)

(56) References Cited

U.S. PATENT DOCUMENTS 4,583,894 A * 4/1986 Mitchell ............... B23B 31/263
408/239 A
4,729,701 A * 3/1988 Chaur-Sheng ........ B23B 31/266
409/233
(Continued)

FOREIGN PATENT DOCUMENTS

EP 0440096 A1 1/1991
EP 0440096 A1 * 8/1991 ............... B23Q 1/70
(Continued)

OTHER PUBLICATIONS

Japanese Office Action for JP Application No. 2014-245616 dated Jul. 11, 2018 (10 pages with English translation).
(Continued)

*Primary Examiner* — Nathaniel C Chukwurah
*Assistant Examiner* — Lucas E. A. Palmer
(74) *Attorney, Agent, or Firm* — Eversheds Sutherland (US) LLP

(57) ABSTRACT

A spindle unit for machine tools that includes a working spindle rotationally bearing-mounted in axially spaced spindle bearings in a spindle case, and an electric driving motor. The working spindle includes at its head side a clamping device for a tool and at its rear side a non-rotating ring cylinder for activating said clamping device via a rotating tie rod, and rotational bushing for supplying said tool with cooling and/or lubricating agents through a hydraulic conduit extending longitudinally through said working spindle. At least a segment of the non-rotating ring cylinder may be received in the rear end portion of said working spindle.

11 Claims, 1 Drawing Sheet

(51) Int. Cl.
    *B23Q 17/00*     (2006.01)
    *B23B 31/26*     (2006.01)
    *B23B 31/12*     (2006.01)

(52) U.S. Cl.
    CPC ........ *B23Q 17/003* (2013.01); *B23Q 11/1015* (2013.01); *Y10T 409/309464* (2015.01)

(58) Field of Classification Search
    USPC ........................................................ 173/213
    See application file for complete search history.

(56) References Cited

U.S. PATENT DOCUMENTS

| | | | | |
|---|---|---|---|---|
| 4,748,357 | A * | 5/1988 | Kempken | B23B 31/28 310/80 |
| 5,039,261 | A * | 8/1991 | Takada | B23B 31/263 279/4.06 |
| 5,145,298 | A * | 9/1992 | Marantette | B23Q 1/70 279/51 |
| 5,662,442 | A * | 9/1997 | Taki | B23B 31/261 408/239 R |
| 5,783,887 | A * | 7/1998 | Ueyama | B23Q 1/70 310/90.5 |
| 6,409,441 | B1 * | 6/2002 | Lind | B23B 31/261 279/900 |
| 6,413,027 | B1 * | 7/2002 | Lind | B23B 31/261 384/227 |
| 2004/0228697 | A1 * | 11/2004 | Herla | B23B 31/06 409/231 |
| 2005/0141976 | A1 * | 6/2005 | Feldmeier | B23B 31/28 409/233 |
| 2005/0232720 | A1 * | 10/2005 | Lu | B23B 31/265 409/233 |
| 2008/0152451 | A1 * | 6/2008 | Yamazaki | B23B 31/265 409/231 |
| 2009/0053005 | A1 * | 2/2009 | Kikkawa | B23B 31/265 409/231 |
| 2009/0136313 | A1 * | 5/2009 | Soshi | B23Q 5/10 409/233 |
| 2010/0028094 | A1 | 2/2010 | Yoneyama et al. | |
| 2011/0074121 | A1 * | 3/2011 | Hangleiter | B23B 31/261 279/66 |
| 2013/0004257 | A1 * | 1/2013 | Suzuki | B23B 31/265 409/233 |

FOREIGN PATENT DOCUMENTS

| | | | |
|---|---|---|---|
| EP | 0440096 A1 * | 8/1991 | ............ B23Q 1/70 |
| EP | 2138253 A1 * | 12/2009 | ......... B23B 31/261 |
| EP | 2554301 A1 | 2/2013 | |
| JP | 2005-28534 A | 2/2005 | |
| JP | 2012-035376 A | 2/2012 | |

OTHER PUBLICATIONS

Japanese Office Action for JP Application No. 2014-245616 dated Oct. 24, 2018 (8 pages with English translation).

\* cited by examiner

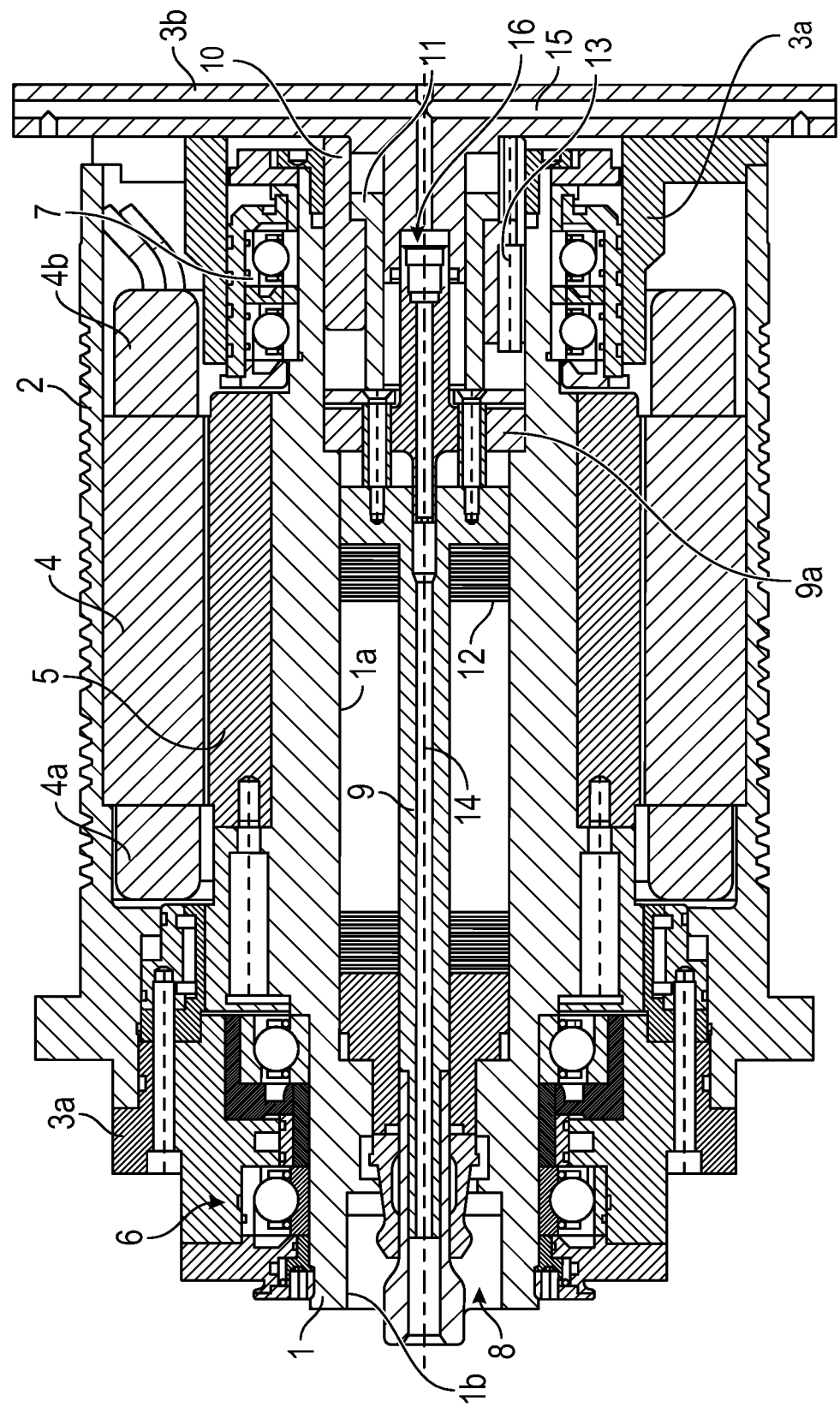

SPINDLE UNIT FOR TURNING AND MILLING MACHINES

CROSS REFERENCES TO RELATED APPLICATIONS

This application claims the benefit of European Patent Application No. 13195734.2, filed Dec. 4, 2013, which is hereby incorporated by reference herein in its entirety.

FIELD OF INVENTION

The invention relates to a spindle unit for machine tools comprising a working spindle rotationally bearing-mounted in a spindle case and an electric driving motor.

BACKGROUND

Such a spindle is, for example, known from EP 14 09 197 B1 in which a tie rod loaded at one side by a spring package is arranged in a continuous bore, said tie rod comprising at its one end a clamping head with which the tool can be retracted in a clamping cone of said tool spindle. In order to supply the tools with lubricating or cooling means, the tie rod itself comprises a longitudinal bore to which a non-rotating conduit is coupled via a rotational bushing. The work piece spindle is rotationally bearing-mounted in the direction of the rotating axis in front of and behind the driving motor consisting of a rotor and a stator. A clamping cylinder is flange-mounted to said spindle case which is able to push the tie rod against the spring force in order to release the tool tension. The rotational bushing is arranged in the zone of the rear rolling bearing.

Another tool spindle is known from EP 17 87 744 A1 having a similar construction as that described above. In this spindle the rotational bushing is arranged in the zone of the ring cylinder.

Both embodiments have the disadvantage that their construction length is relatively long and, therefore, they need some space in the working space of turning and milling machines. Further, the danger of collisions with surrounding parts or other aggregates of the machine increases, especially in machine tools having a pivotable spindle unit.

EP 2 554 301 A1 shows a generic working spindle in which the releasing unit for the tool is integrated into the spindle.

EP 2 138 253 A1 shows a motor spindle comprising a conventional construction and a sensor provided outside of the working spindle for detecting the position of the tie rod of the releasing unit.

Further, motor spindles are known from the prior art in which the clamping cylinder is integrated into the spindle shaft and, therefore, also rotates. In this manner, when changing the tool, the power flow may completely be introduced into the shaft, such that special means for releasing the rolling bearings may be omitted. An example of such a spindle is described in the article "Wellenkühlung optimiert Motorspindeln", Schweizer Maschinenmarkt 19, 2011, pages 114 to 117. However, such clamping cylinders which are integrated into the shaft present complexly configured rotational bushings which have to transfer three fluids in order to introduce the cooling agent and to introduce the hydraulic driving.

SUMMARY OF INVENTION

Some exemplary embodiments are based on the object to provide a tool motor spindle presenting a construction which is as simplified and compact as possible.

Therefore, some exemplary embodiments provide a spindle unit for machine tools comprising a working spindle rotationally bearing-mounted in a spindle case and an electric driving motor, wherein said motor spindle comprises at its head side a clamping device for a tool and at its rear side a non-rotating ring cylinder for actuating said clamping device via a rotating tie rod, and a rotational bushing in order to supply the tools with a cooling and/or lubricating agent through a hydraulic conduit extending longitudinally through said working spindle.

BRIEF DESCRIPTION OF DRAWINGS

Further advantages of exemplary embodiments become obvious based on the following description of examples referring to a preferred exemplary embodiment of the spindle unit shown in the drawing.

FIG. 1 is a schematic drawing of a spindle unit according to certain embodiments.

DETAILED DESCRIPTION

The object mentioned above is achieved in the spindle unit by the fact that at least a segment of the non-rotating ring cylinder is received in a rear end portion of the working spindle. According to the invention a sensor for detecting the position of said tie rod is arranged in the zone of this segment.

Here, the approach is based on the principle to integrate the construction of said ring cylinder as far as possible into the open bore of the rear end portion of said working spindle. Here, according to the invention only non-rotating ring cylinders which as such are already known are employed. In this manner the basic construction of the motor spindle may be kept simple while at the same time a highly compact construction may be achieved.

A special advantage of the spindle unit results from the inventive arrangement of said sensor for detecting the position of said tie rod of said releasing device in the zone of the non-rotating part, however, within said working spindle. Here, the sensor may generate a first signal, when said tie rod is displaced into a position in which a tool is clamped, a second signal, when said tie rod is displaced in the clamping direction without any clamped tool, and a third signal, when said clamping device is opened.

In an embodiment which is configured extremely compact, also a main portion of said rotational bushing is received in said rear end portion of said working spindle, wherein said main portion of said rotational bushing may be inserted into said non-rotating ring cylinder. In this manner the axial construction length of said motor spindle may additionally be reduced.

The exemplary concept may be particularly advantageously applied in conventional motor spindles in which said electric driving motor comprises a stator mounted fixedly in said spindle case and a rotor secured on said working spindle. In this manner even powerful rotor spindles may be embodied with small outer dimensions. Here, the rear rolling bearing, the ring cylinder and the bushing may be arranged at least partially within the winding head of the stator, whereby an particularly compact construction is realized.

However, the employment of the spindle unit is not limited to conventional motor spindles in which the driving motor acts directly without gear ratio on the working spindle, but particularly also presents a technological advantage in transmission spindles for machining large-volume components.

Moreover, the construction of the spindle unit is also advantageous in turning and milling machines because here the length of the milling spindle plays a critical role due to the given distance between the main spindle and the tailstock.

The axial construction length of the spindle unit may be further reduced by bearing-mounting the rear end portion of the working spindle in which at least a segment of the non-rotating ring cylinder and possibly also the segment of the rotating device are received, in the rear rolling-bearing, wherein the segments of said ring cylinder and possibly of said rotational bushing as well as said rolling-bearing are arranged in the same axial portion "one above the other" and are mutually overlapping.

The advantages mentioned above are particularly realized by the fact that the static ring cylinder is fitted into a possibly extended rear portion of a bore extending through said working spindle. Here, a rear segment of said ring cylinder in the rear zone of said spindle may protrude from the bore, wherein it is substantial that both of those zones are integrated into each other.

As shown in FIG. 1, a tool spindle (1) is rotationally bearing-mounted in a spindle case (2) by means of front rolling-bearings (6) and rear rolling-bearings (7). The spindle case (2) comprises a front spindle case lid (3a) and rear spindle case lid (3b). In the spindle case (2) a stator (4) of an electric motor including winding heads (4a) and (4b) is secured. A rotor (5) is arranged within that stator (4) and is non-rotationally connected to said tool spindle (1). The rear case lid (3b) comprises a duct (3c) extending beneath said rear winding head (4b) of said stator (4), such that it lies in the zone of said winding head (4b).

The working spindle (1) comprises a continuous central bore (1a) traversed by a tie rod (9) rotating together with said working spindle (1). On said tie rod (9) a clamping device (8) for clamping a tool is secured. Said tie rod (9) is biased to the rear side by the spring package (12). On a shoulder (9a) connected to said tie rod (9) the piston rod of the non-rotating ring cylinder piston (11) abuts, wherein said piston (11) may be displaced in a ring cylinder (10) against the force of said spring package (12). In this position the rear surface of said shoulder (9a) is substantially radially aligned with the terminating surface of the said rotor (5) which illustrates the compact construction of the tool spindle according to the invention. The rear spindle case lid (3b) is traversed by the cooling agent conduit (15) connected via a rotational bushing (16) to said longitudinal bore (14) in said rotating tie rod (9). By means of this longitudinal bore said clamped tool, not shown, is supplied with a cooling agent and/or lubricant. The rotational bushing (16) is arranged within said ring cylinder (10) and said ring cylinder piston (11). Here, the ring cylinder (10) is fitted into said bore (1a) in the rear portion of said tool spindle (1) and is radially surrounded by said rolling-bearing. Therefore, this arrangement only partially lies within the space limited by said winding head (4b) and said duct (3c), respectively, in the rear end portion of said bore (1a).

Additionally, said ring cylinder 10 comprises a bore into which a sensor (13) is inserted. This sensor (13) is dampened by a shoulder (9a) connected to said tie rod when said spring package (12) displaces said tie rod (9) to the rear side. When a tool is inserted into the inner cone (lb) it may be clamped by said clamping device (8) by displacing said tie rod (9) to the rear side by said spring force. To that, said ring cylinder (10) is set without pressure and is lifted from said shoulder (9a). Here, the sensor (13) is able to detect the positions of said tie rod (9) when a tool is claimed, when the clamping device (8) is opened and when said clamping device (8) is closed without a tool.

What is claimed is:
1. A spindle unit for machine tools, comprising:
a working spindle rotationally bearing-mounted in axially spaced spindle bearings in a spindle case;
an electric driving motor, wherein said driving motor comprises at its head side a clamping device for a tool and at its rear side a non-rotating ring cylinder for activating said clamping device via a rotating tie rod, and a rotational bushing for supplying the tools with cooling and/or lubricating agents through a hydraulic conduit extending longitudinally through said working spindle, wherein at least a segment of said non-rotating ring cylinder is received in a rear end portion of said working spindle; and
a sensor for detecting a position of said tie rod arranged in a zone of said segment of said non-rotating ring cylinder that is received in said rear end portion of said working spindle wherein said sensor is arranged in a bore of said non-rotating ring cylinder,
wherein said electric driving motor comprises
a stator fixedly mounted in said spindle case; and
a rotor secured on said working spindle, wherein a rear spindle bearing configured to support the spindle, said ring cylinder, and said rotational bushing are at least partially arranged within a space formed inside a winding head of said stator.
2. The spindle unit for machine tools according to claim 1, wherein at least a main portion of said rotational bushing is arranged in said rear end portion of said working spindle.
3. The spindle unit for machine tools according to claim 2, wherein said main portion of said rotational bushing is received in said non-rotating ring cylinder.
4. The spindle unit for machine tools according to claim 3, wherein said sensor for detecting the position of said tie rod arranged within said working spindle generates:
a first signal when said tie rod is displaced in a clamping direction into a position for clamping a tool,
a second signal when said tie rod is displaced in the clamping direction without any clamped tool, and
a third signal when said clamping device is opened.
5. The spindle unit for machine tools according to claim 2, wherein said sensor for detecting the position of said tie rod arranged within said working spindle generates:
a first signal when said tie rod is displaced in a clamping direction into a position for clamping a tool,
a second signal when said tie rod is displaced in the clamping direction without any clamped tool, and
a third signal when said clamping device is opened.
6. The spindle unit for machine tools according to claim 1, wherein said rear end portion of said working spindle in which at least said segment of said non-rotating ring cylinder is received is bearing-mounted in a rear spindle bearing, wherein said segment of said non-rotating ring cylinder and said spindle bearing are overlapping each other in the radial direction.
7. The spindle unit for machine tools according to claim 6, wherein said sensor for detecting the position of said tie rod arranged within said working spindle generates:
a first signal when said tie rod is displaced in a clamping direction into a position for clamping a tool, a second signal when said tie rod is displaced in the clamping direction without any clamped tool, and a third signal when said clamping device is opened.

8. The spindle unit for machine tools according to claim 1, wherein said rear end portion of said working spindle in which at least said segment of said non-rotating ring cylinder and a segment of said rotational bushing are received is bearing-mounted in a rear spindle bearing, wherein said segment of said non-rotating ring cylinder, said segment of said rotational bushing, and said spindle bearing are overlapping each other in the radial direction.

9. The spindle unit for machine tools according to claim 8, wherein said sensor for detecting the position of said tie rod arranged within said working spindle generates:

a first signal when said tie rod is displaced in a clamping direction into a position for clamping a tool, a second signal when said tie rod is displaced in the clamping direction without any clamped tool, and a third signal when said clamping device is opened.

10. The spindle unit for machine tools according to claim 1, wherein said sensor for detecting the position of said tie rod arranged within said working spindle generates:

a first signal when said tie rod is displaced in a clamping direction into a position for clamping a tool, a second signal when said tie rod is displaced in the clamping direction without any clamped tool, and a third signal when said clamping device is opened.

11. The spindle unit for machine tools according to claim 1, wherein said ring cylinder is inserted into an expanded end portion of a bore that extends through said working spindle.

* * * * *